(12) United States Patent
Miura et al.

(10) Patent No.: US 11,009,340 B2
(45) Date of Patent: May 18, 2021

(54) FILM THICKNESS MEASURING METHOD AND FILM THICKNESS MEASURING APPARATUS

(71) Applicant: TOYOTA JIDOSHA KABUSHIKI KAISHA, Toyota (JP)

(72) Inventors: Masanori Miura, Toyota (JP); Jun Takayanagi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 15/924,508

(22) Filed: Mar. 19, 2018

(65) Prior Publication Data
US 2018/0274904 A1 Sep. 27, 2018

(30) Foreign Application Priority Data

Mar. 22, 2017 (JP) .............................. JP2017-056505

(51) Int. Cl.
*G01B 11/06* (2006.01)
*G01N 21/3586* (2014.01)
(Continued)

(52) U.S. Cl.
CPC ...... *G01B 11/0633* (2013.01); *G01B 11/0625* (2013.01); *G01B 11/0691* (2013.01);
(Continued)

(58) Field of Classification Search
CPC ............ G01B 11/0633; G01B 11/0625; G01B 15/02; G01N 21/8422; G01N 21/3586
See application file for complete search history.

(56) References Cited

U.S. PATENT DOCUMENTS 3,017,512 A * 1/1962 Wolbert ............. G01B 11/0633
250/349
3,973,122 A * 8/1976 Goldberg ........... G01B 11/0625
250/338.1
2012/0326037 A1 12/2012 Ohtake et al.

FOREIGN PATENT DOCUMENTS

CN 1215151 A 4/1999
CN 102770750 A 11/2012
(Continued)

OTHER PUBLICATIONS

CN 102770750 B—Otake et al.—Google Patents English Translation obtained Nov. 7, 2019 (Year: 2019).*
(Continued)

*Primary Examiner* — David P Porta
*Assistant Examiner* — Jeremy S Valentiner
(74) *Attorney, Agent, or Firm* — Sughrue Mion, PLLC

(57) ABSTRACT

A film thickness measuring apparatus includes a displacement sensor, and a film thickness calculator that includes a first processor, a second processor, and a third processor. The displacement sensor detects displacement of a sheet in its thickness direction at a location opposite to a portion of a terahertz scanner from which a terahertz wave is applied to a conveyance path. In accordance with a detection signal provided by the displacement sensor, the first processor determines the speed of displacement of the sheet in its thickness direction while the sheet is conveyed along the conveyance path. In accordance with the speed of displacement, the second processor corrects a scan waveform acquired by the terahertz scanner. In accordance with the peaks of the intensity of the terahertz wave that appear in the scan waveform corrected by the second processor, the third processor calculates the thickness of a film formed on the sheet.

4 Claims, 5 Drawing Sheets

(51) Int. Cl.
*G01B 15/02* (2006.01)
*G01N 21/84* (2006.01)

(52) U.S. Cl.
CPC ......... *G01B 15/02* (2013.01); *G01N 21/3586* (2013.01); *G01N 21/8422* (2013.01)

(56) References Cited

FOREIGN PATENT DOCUMENTS

| CN | 102770750 B | * 11/2014 | ............. G01B 11/06 |
| JP | 2004-028618 A | 1/2004 | |
| JP | 2012-225718 A | 11/2012 | |
| WO | WO-2017051579 A1 | * 3/2017 | ............. G01B 15/02 |

OTHER PUBLICATIONS

WO 2017/051579 A1—Tonouchi et al.—Google Patents English Translation Nov. 7, 2019 (Year: 2019).*

* cited by examiner

FILM THICKNESS MEASURING METHOD AND FILM THICKNESS MEASURING APPARATUS

CROSS-REFERENCE TO RELATED APPLICATIONS

The present application claims priority from Japanese Patent Application No. 2017-056505 filed on Mar. 22, 2017, which is incorporated by reference herein in its entirety.

BACKGROUND OF THE INVENTION

1. Field of the Invention

The present invention relates to film thickness measuring methods and film thickness measuring apparatuses.

2. Description of the Related Art

JP 2004-28618 A discloses a film thickness measuring method that utilizes a terahertz wave. The film thickness measuring method disclosed in JP 2004-28618 A involves adding a double refraction amount to optically delayed probe pulsed light using electro-optical effect in accordance with the intensity of terahertz echo pulse reflected from a coating film. The method then involves photoelectrically converting the probe pulsed light into an electric signal and synchronously detecting the electric signal in accordance with a reference high frequency signal so as to generate a measurement signal substantially proportional to the double refraction amount added to the probe pulsed light. The method subsequently involves time-dividing the terahertz echo pulse while changing the amount of delay time, thus measuring a signal waveform. The method then involves calculating a time difference between the terahertz echo pulses so as to calculate the thickness of the coating film.

JP 2012-225718 A discloses an apparatus to measure, utilizing a terahertz wave, the thickness of a film having a curved surface. Industrial products to be used as samples usually have various shapes and thus do not necessarily have flat surfaces. Even if the surface of a coating film seems to be flat, the surface of the coating film actually has height differences induced by innumerable microscopic asperities and island materials. Suppose that light having a predetermined beam diameter is applied onto the surface of a coating film having height differences. In this case, the height differences are integrated when the height differences are detected. This makes it impossible to distinguish between the film thickness and the height differences and thus makes it difficult to accurately detect the film thickness. The technique disclosed in JP 2012-225718 A involves calculating a reference signal indicative of an electric field intensity of a reflected wave from a reflection surface to a terahertz wave detector in accordance with information on the shape of the reflection surface of a sample. The technique subsequently involves correcting a detection signal using the reference signal. The technique disclosed involves presenting the electric field intensity of the corrected detection signal in the form of time axis waveform data so as to detect peaks from the waveform data and calculate the film thickness in accordance with a time difference between the peaks.

SUMMARY OF THE INVENTION

The inventor of the present invention has conducted studies on, for example, measuring the thickness of a film formed on a strip-shaped sheet while conveying the sheet by a roll-to-roll process. A strip-shaped sheet may vibrate while being conveyed, resulting in displacement of the sheet in its thickness direction. Because such a method involves detecting a reflected wave of a terahertz wave applied to a sheet, serving as a target for measurement, so as to measure the thickness of a film formed on the sheet, displacement of the sheet in its thickness direction while the sheet is conveyed makes it difficult to accurately measure the thickness of the film.

An embodiment of the present invention disclosed herein provides a film thickness measuring method including:

a) conveying, along a predetermined conveyance path, a sheet on which a film serving as a target for measurement is formed;

b) applying a terahertz wave to the sheet in its thickness direction while the sheet is conveyed along the conveyance path;

c) receiving the terahertz wave reflected off the sheet, and recording an intensity of the received terahertz wave over time so as to acquire a scan waveform;

d) measuring, concurrently with step b), a speed of displacement of the sheet in its thickness direction while the sheet is conveyed along the conveyance path;

e) correcting the scan waveform in accordance with the speed of displacement of the sheet in its thickness direction; and f) calculating a thickness of the film of the sheet in accordance with peaks of the intensity of the terahertz wave that appear in the scan waveform corrected.

Step e) may involve correcting the scan waveform in accordance with a correction map including a relationship between the speed of displacement of the sheet in its thickness direction and a variation in time axis of the scan waveform.

The film thickness measuring method described above involves recording the intensity of the received terahertz wave over time so as to acquire the scan waveform, and correcting the scan waveform in accordance with the speed of displacement of the sheet being conveyed. The method then involves calculating the film thickness in accordance with the scan waveform corrected. Thus, the method accurately calculates the thickness of the film of the sheet while the sheet is conveyed.

Another embodiment of the present invention disclosed herein provides a film thickness measuring apparatus including a conveyor, a terahertz scanner, a displacement sensor, and a film thickness calculator.

The conveyor is configured to convey a sheet along a predetermined conveyance path.

The terahertz scanner includes an applicator, a receiver, and a scan waveform acquirer. The applicator is configured to apply a terahertz wave to the sheet in its thickness direction while the sheet is conveyed along the conveyance path. The receiver is configured to receive the terahertz wave reflected off the conveyance path. The scan waveform acquirer is configured to record, over time, an intensity of the terahertz wave in accordance with a detection signal indicative of the terahertz wave received by the receiver, so as to acquire a scan waveform.

The displacement sensor is configured to detect displacement of the sheet in its thickness direction at a location opposite to a portion of the terahertz scanner from which the terahertz wave is applied to the conveyance path.

The film thickness calculator includes a first processor, a second processor, and a third processor.

The first processor is configured to determine, in accordance with a detection signal provided by the displacement sensor, a speed of displacement of the sheet in its thickness direction while the sheet is conveyed along the conveyance path.

The second processor is configured to correct, in accordance with the speed of displacement, the scan waveform acquired by the terahertz scanner.

The third processor is configured to calculate, in accordance with peaks of the intensity of the terahertz wave that appear in the scan waveform corrected by the second processor, a thickness of a film formed on the sheet.

The film thickness calculator may include a recorder recording a correction map including a relationship between the speed of displacement of the sheet in its thickness direction and a variation in time axis of the scan waveform. In this case, the second processor is preferably configured to correct the scan waveform in accordance with the correction map recorded in the recorder.

The film thickness measuring apparatus described above determines the speed of displacement of the sheet in its thickness direction in accordance with the detection signal provided by the displacement sensor, and corrects, in accordance with the speed of displacement, the scan waveform acquired by the terahertz scanner. The apparatus then calculates the film thickness in accordance with the scan waveform corrected. Thus, the apparatus accurately calculates the thickness of the film of the sheet while the sheet is conveyed.

DETAILED DESCRIPTION OF THE PREFERRED EMBODIMENTS

A film thickness measuring method and a film thickness measuring apparatus according to an embodiment of the present invention disclosed herein will be described below. The embodiment described below is naturally not intended to limit the present invention in any way. Unless otherwise specified, the present invention is not limited to the embodiment described below.

Figure 1:
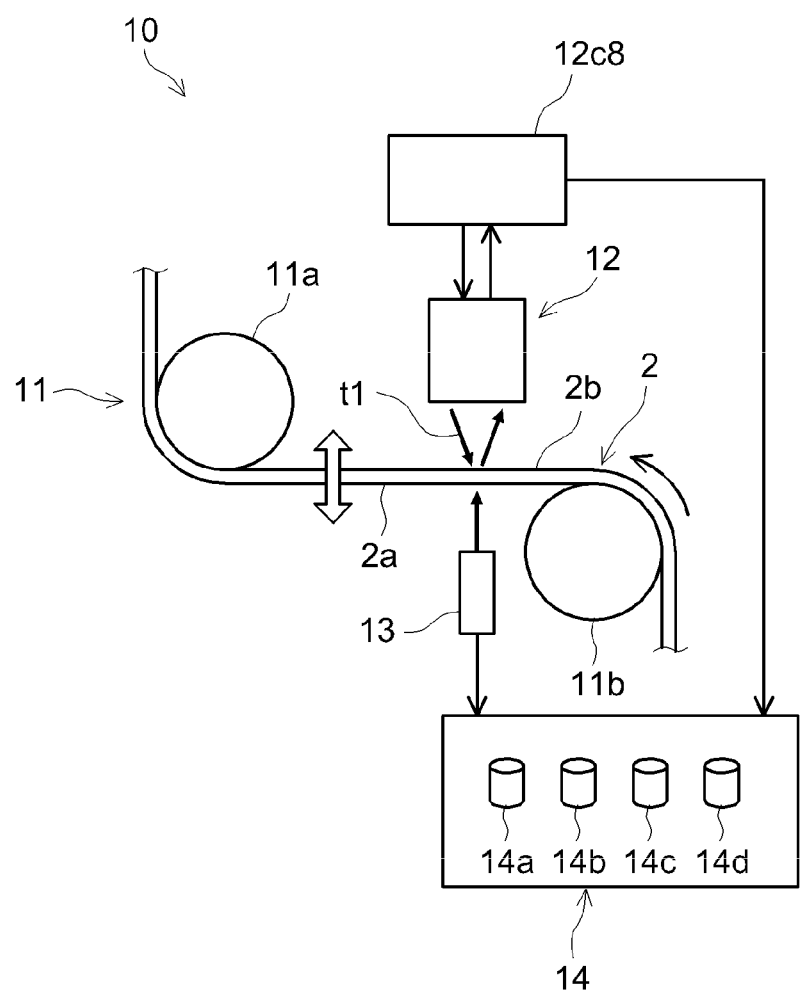
FIG. 1 is a schematic diagram of a film thickness measuring apparatus 10.

FIG. 1 is a schematic diagram of a film thickness measuring apparatus 10. The film thickness measuring apparatus 10 performs the film thickness measuring method according to the present embodiment. As illustrated in FIG. 1, the film thickness measuring apparatus 10 includes a conveyor 11, a terahertz scanner 12, a displacement sensor 13, and a film thickness calculator 14.

The conveyor 11 is configured to convey a sheet 2 along a predetermined conveyance path. In the present embodiment, the conveyor 11 is configured to convey the sheet 2 having a strip shape. The conveyor 11 includes the predetermined conveyance path along which the sheet 2 is to be conveyed. As illustrated in FIG. 1, the conveyor 11 further includes conveyance rolls 11a and 11b to convey the sheet 2 along the conveyance path. As illustrated in FIG. 1, the sheet 2 conveyed by the conveyor 11 vibrates upon receiving mechanical vibrations.

At least one side of a substrate 2a of the sheet 2 to be conveyed is provided with a film 2b serving as a target for measurement. As illustrated in FIG. 1, the sheet 2 is conveyed such that the film 2b (which serves as a target for measurement) faces toward a portion of the terahertz scanner 12 from which a terahertz wave t1 is to be applied. In one example, the sheet 2 may be an electrode sheet to be used as an electrode for a secondary battery. When the sheet 2 is an electrode sheet, the substrate 2a is metallic foil, for example. The film 2b may be an active material layer containing active material particles. The substrate 2a may be metallic foil having a thickness of about 10 μm to about 15 μm, for example. The film 2b may be an active material layer having a thickness of about 10 μm to about 100 μm, for example.

The film 2b that is an active material layer or a heat-resistant insulating layer, for example, is desirably formed to a predetermined thickness. The resulting thickness, however, may vary from the predetermined thickness even when the conditions of formation of the film 2b only slightly change. In order for a secondary battery to achieve necessary functions, the active material layer or heat-resistant insulating layer is required to be formed to a predetermined thickness. The film thickness measuring apparatus 10 may be used to examine whether the active material layer or heat-resistant insulating layer, for example, is formed to a suitable thickness. The present embodiment is described on the assumption that the film thickness measuring method and the film thickness measuring apparatus are used to measure the thickness of a film formed on a sheet, such as an electrode sheet for use in manufacture of a secondary battery. The film thickness measuring method and the film thickness measuring apparatus according to the present embodiment, however, may find applications other than manufacture of a secondary battery. The film thickness measuring method and the film thickness measuring apparatus according to the present embodiment may be used in a wide range of applications involving measuring the thickness of a film formed on a sheet.

Figure 2:
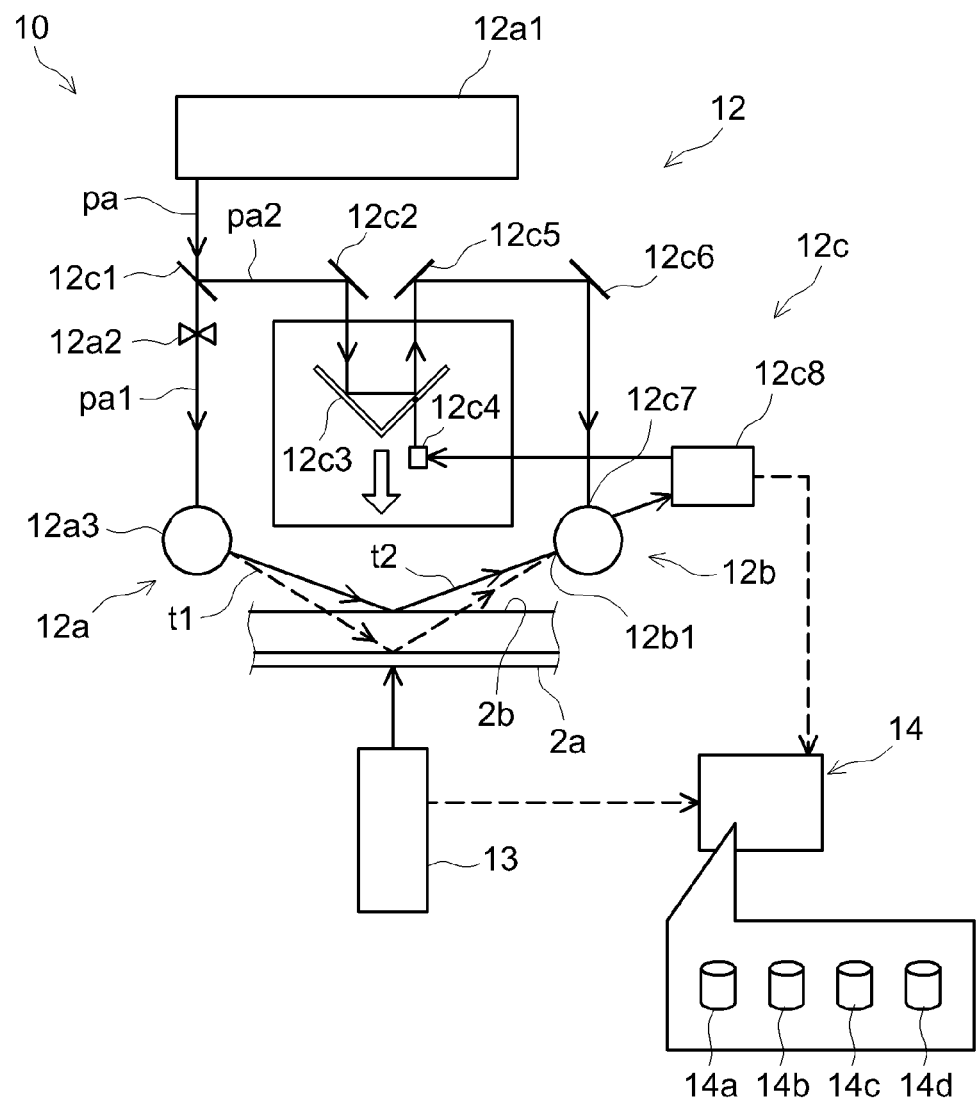
FIG. 2 is a schematic diagram illustrating a structure of a terahertz scanner 12 included in the film thickness measuring apparatus 10.

FIG. 2 is a schematic diagram illustrating a structure of the terahertz scanner 12 included in the film thickness measuring apparatus 10.

As illustrated in FIG. 2, the terahertz scanner 12 includes an applicator 12a, a receiver 12b, and a scan waveform acquirer 12c. An optical device disclosed in JP 2012-225718 A, for example, is equivalent to the terahertz scanner 12. A device equivalent to the terahertz scanner 12 is disclosed also in JP 2004-28618 A. The terahertz scanner 12 may be a provided by a combination of techniques known in the art.

The applicator 12a is configured to apply the terahertz wave t1 to the sheet 2 in its thickness direction while the sheet 2 is conveyed along the conveyance path. In the present embodiment, the applicator 12a includes a laser emitter 12a1, a modulator 12a2, and a terahertz wave generator 12a3. In one example, the laser emitter 12a1 may be a femtosecond laser emitter, such as a femtosecond fiber laser. The laser emitter 12a1 generates pulsed light that includes "pump light". The pulsed light generated by the laser emitter 12a1 will hereinafter be referred to as "pulsed light pa". The pulsed light pa emitted from the laser emitter 12a1 is divided into first pulsed light pa1 and second pulsed light pa2 by a spectroscope 12c1 (which will be described below). The first pulsed light pa1 is modulated into a pulse having a predetermined frequency by the modulator 12a2 and sent to the terahertz wave generator 12a3. The second pulsed light pa2 is used as probe light.

A terahertz wave generating element may be used as the terahertz wave generator 12a3. The terahertz wave generating element includes an organic nonlinear optical crystal, such as 4-dimethylamino-N-methyl-4-stilbazolium tosylate (DAST), for example. The first pulsed light pa1 generated by an ultra-short pulse femtosecond laser, for example, is incident on the terahertz wave generator 12a3. This causes the terahertz wave generator 12a3 to output the terahertz wave t1 with a frequency of several tens of THz or more. As illustrated in FIG. 2, the terahertz wave generator 12a3 is disposed such that the terahertz wave t1 is applied to the sheet 2 in its thickness direction while the sheet 2 is conveyed along the conveyance path.

The receiver 12b is configured to receive a terahertz wave reflected from the conveyance path. In the present embodiment, the receiver 12b includes a terahertz wave detector 12b1. The terahertz wave detector 12b1 receives a terahertz wave t2 reflected from the sheet 2 conveyed along the conveyance path. The terahertz wave detector 12b1 provides a detection signal upon detecting a pulse wave of the second pulsed light pa2 that is probe light sent from the scan waveform acquirer 12c (which will be described below). The detection signal is an instantaneous signal proportional to the electric field of the terahertz wave t2. The terahertz wave generating element that may be used as the terahertz wave generator 12a3 and a terahertz wave detecting element that may be used as the terahertz wave detector 12b1 are known in the art as disclosed in JP 2004-28618 A and JP 2012-225718 A. Thus, these elements will not be described in detail.

The scan waveform acquirer 12c is configured to record, over time, the intensity of the terahertz wave received by the receiver 12b so as to acquire a scan waveform. In the present embodiment, the scan waveform acquirer 12c includes the spectroscope 12c1, a first mirror 12c2, a movable mirror 12c3, an actuator 12c4, a second mirror 12c5, a third mirror 12c6, a probe light receiver 12c7, and a scan waveform sampler 12c8.

The spectroscope 12c1 divides the pulsed light pa emitted from the laser emitter 12a1 into the first pulsed light pa1 and the second pulsed light pa2. The first pulsed light pa1 is sent to the terahertz wave generator 12a3 so as to cause the terahertz wave generator 12a3 to generate the terahertz wave t1. The second pulsed light pa2 is reflected by the first mirror 12c2, the movable mirror 12c3, the second mirror 12c5, and the third mirror 12c6 in this order and then sent to the probe light receiver 12c7. The first mirror 12c2 and the second mirror 12c5 are immovable. The movable mirror 12c3 is moved by the actuator 12c4. Moving the movable mirror 12c3 by the actuator 12c4 changes the optical path length of the second pulsed light pa2.

A change in the optical path length of the second pulsed light pa2 changes the time at which the second pulsed light pa2 reaches the probe light receiver 12c7 of the receiver 12b. The scan waveform sampler 12c8 drives the actuator 12c4 in accordance with a predetermined program so as to move the movable mirror 12c3. The terahertz wave detector 12b1 outputs the detection signal to the scan waveform sampler 12c8 at the time when the second pulsed light pa2 reaches the probe light receiver 12c7. The detection signal is proportional to the intensity of the terahertz wave t2. The scan waveform sampler 12c8 records, over time, the detection signal output to the scanned waver sampler 12c8 and proportional to the intensity of the terahertz wave t2. Recording the intensity of the terahertz wave t2 over time in accordance with the record of the detection signal provides a scan waveform.

The scan waveform acquirer 12c records (or plots), over time, the intensity of the terahertz wave t2 received by the receiver 12b. Connecting the plots of the intensity of the terahertz wave t2 provides a scan waveform. Scanning the movable mirror 12c3, for example, makes it possible to plot the intensity of the terahertz wave t2 at regular time intervals (e.g., at intervals of 100 milliseconds) so as to acquire a reflection waveform. The terahertz scanner 12 employs what is called a pump-probe method in the above-described manner so as to acquire a waveform responsive to the intensity of the terahertz wave t2 reflected off the sheet 2. The principles of the terahertz scanner 12 operating as described above are disclosed in, for example, JP 2004-28618 A and JP 2012-225718 A.

Figure 3:
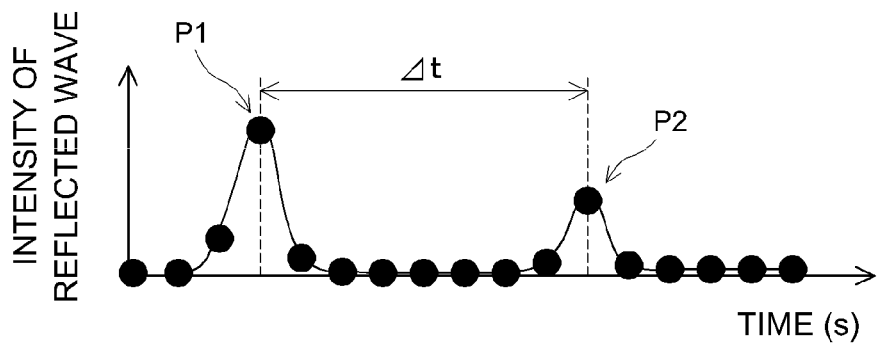
FIG. 3 is a graph illustrating an example of a scan waveform acquired by a scan waveform acquirer 12c.

FIG. 3 is a graph illustrating an example of a scan waveform acquired by the scan waveform acquirer 12c. In FIG. 3, the horizontal axis represents time, and the vertical axis represents the intensity of the terahertz wave t2 reflected from the sheet 2. As illustrated in FIG. 3, the scan waveform acquirer 12c records, over time, the intensity of the terahertz wave t2 received by the receiver 12b so as to acquire the scan waveform. In the example illustrated in FIG. 3, the scan waveform acquirer 12c acquires the scan waveform while the movable mirror 12c3 is moved by the actuator 12c4 such that the optical path length of the second pulsed light pa2 is gradually increased.

As illustrated in FIG. 2, a portion of the terahertz wave t1 applied to the sheet 2 is reflected off the surface of the film 2b of the sheet 2, so that the reflected terahertz wave t2 is detected by the terahertz wave detector 12b1. A portion of the terahertz wave t1 applied to the sheet 2 passes through the film 2b of the sheet 2 and is reflected off the substrate 2a of the sheet 2, so that the reflected terahertz wave t2 is detected by the terahertz wave detector 12b1. Recording the intensity of the terahertz wave t2 received by the receiver 12b while gradually increasing the optical path length of the second pulsed light pa2 results in two peaks, i.e., a peak P1 and a peak P2, in the scan waveform as illustrated in FIG. 3.

The peak P1 that appears before the peak P2 along the time axis is caused by the terahertz wave t2 reflected off the surface of the film 2b of the sheet 2 and detected by the terahertz wave detector 12b1. The peak P2 that appears after the peak P1 is caused by the terahertz wave t1 that passes through the film 2b of the sheet 2, is reflected off the substrate 2a of the sheet 2, and is detected by the terahertz wave detector 12b1. Thus, the thickness of the film 2b serving as a target for measurement is calculated by a predetermined computational expression in accordance with a time $\Delta t$ between detection of the peak P1 and detection of the peak P2.

The above-described measurement is unlikely to cause any problems when the sheet 2 is stationary. When the sheet 2 is conveyed by the conveyor 11 as illustrated in FIG. 1, however, the sheet 2 receives, for example, mechanical vibrations and flutters during driving of the conveyor 11, resulting in slight displacement of the sheet 2 in its thickness direction. The terahertz wave detector 12b1, for example, is disposed so as to be immovable relative to the conveyance path. Thus, conveyance of the sheet 2 by the conveyor 11 causes a change in the relative distance between the terahertz wave detector 12b1 and the sheet 2. Suppose that the sheet 2 is displaced in its thickness direction by, for example, fluttering of the sheet 2 when the scan waveform is acquired by the scan waveform acquirer 12c as previously described. The time axis of the scan waveform acquired in this case varies from that illustrated in FIG. 3. Specifically, the time $\Delta t$ between detection of the peak P1 and detection of the peak P2 in the scan waveform varies in accordance with the speed of displacement of the sheet 2.

Figure 4:
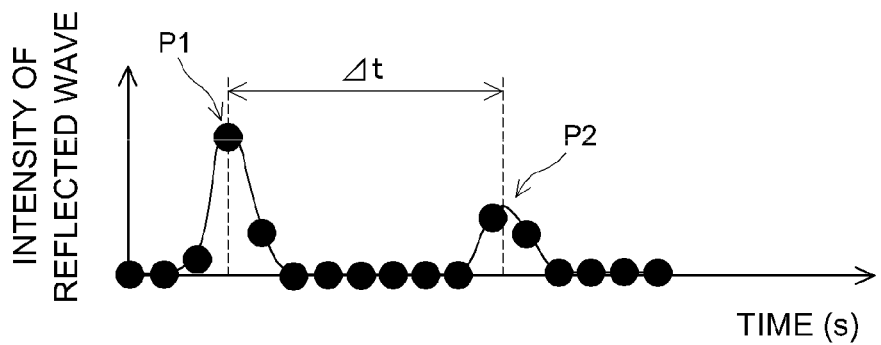
FIG. 4 is a graph illustrating a scan waveform acquired when a sheet 2 is displaced toward a terahertz wave detector 12b1.

FIG. 4 is a graph illustrating a scan waveform acquired when the sheet 2 is displaced toward the terahertz wave detector 12b1. The thickness of the film 2b of the sheet 2 measured in the example illustrated in FIG. 4 is equal to the thickness of the film 2b of the sheet 2 measured in the example illustrated in FIG. 3. As illustrated in FIG. 4, displacement of the sheet 2 toward the terahertz wave detector 12b1 reduces the time $\Delta t$ between detection of the peak P1 and detection of the peak P2. The thickness of the film 2b of the sheet 2 calculated in this case is smaller than the actual thickness of the film 2b.

Plot intervals in the graph of FIG. 4 are shorter than plot intervals in the graph of FIG. 3. Movement of the sheet 2 relative to the terahertz wave detector 12b1 changes a relative scanning speed of the movable mirror. Thus, when the sheet 2 is displaced toward the terahertz wave detector 12b1, time intervals between plots are apparently short as illustrated in FIG. 4.

Although not illustrated, the time $\Delta t$ between detection of the peak P1 and detection of the peak P2 increases when the sheet 2 is displaced away from the terahertz wave detector 12b1. The thickness of the film 2b of the sheet 2 calculated in this case is larger than the actual thickness of the film 2b.

Thus, conveyance of the sheet 2 by the conveyor 11 causes a change in the relative distance between the terahertz wave detector 12b1 and the sheet 2, resulting in inaccurate calculation of the thickness of the film 2b.

The film thickness measuring apparatus 10 disclosed herein includes the displacement sensor 13 to detect displacement of the sheet 2 in its thickness direction. The displacement sensor 13 is configured to detect displacement of the sheet 2 in its thickness direction at a location opposite to a portion of the terahertz scanner 12 from which a terahertz wave is applied to the conveyance path. The displacement sensor 13 is preferably a noncontact distance-measuring sensor. Examples of the noncontact distance-measuring sensor include a laser distance-measuring sensor.

The film thickness calculator 14 includes a first processor 14a, a second processor 14b, and a third processor 14c. In the present embodiment, the film thickness calculator 14 further includes a recorder 14d that records a correction map (see FIG. 5) prepared in advance. In the present embodiment, the film thickness calculator 14 is typically a computer including a predetermined interface, a memory, and a calculator and is configured to calculate, in accordance with a predetermined program, the thickness of the film 2b of the sheet 2 serving as a target for measurement. The first processor 14a, the second processor 14b, and the third processor 14c may be processing modules configured to perform predetermined processes in accordance with a predetermined program.

The first processor 14a is configured to calculate, in accordance with a detection signal provided by the displacement sensor 13, the speed of displacement of the sheet 2 in its thickness direction while the sheet 2 is conveyed along the conveyance path. In other words, the first processor 14a calculates the amount of displacement of the sheet 2 per unit time.

The second processor 14b is configured to correct, in accordance with the displacement speed calculated by the first processor 14a, the scan waveform acquired by the terahertz scanner 12. In the present embodiment, the second processor 14b is configured to correct the scan waveform in accordance with the correction map recorded in the recorder 14d. The relationship between the speed of displacement of the sheet 2 in its thickness direction and a variation in the time axis of the scan waveform is preferably recorded in the correction map. The correction map is preferably prepared in advance.

The relationship between the speed of displacement of the sheet 2 in its thickness direction and a variation in the time axis of the scan waveform is preferably provided in the correction map by performing, for example, a test or a simulation in advance. In one example, a process for providing a correction map including such a relationship involves preparing a sheet including a film formed with accuracy and having a known thickness, and acquiring a scan waveform by the terahertz scanner 12 while the sheet is conveyed by the conveyor 11. The process then involves calculating the thickness of the film of the sheet in accordance with the peaks of terahertz wave intensity that appear in the scan waveform. The process subsequently involves determining the relationship between the film thickness calculated in this case and the speed of displacement of the sheet in its thickness direction. The process then preferably involves determining, in accordance with a variation in the film thickness observed in this case, the relationship between the speed of displacement of the sheet in its thickness direction and a variation in the time axis of the scan waveform. The correction map may be provided by simulating the process on a computer.

Figure 5:
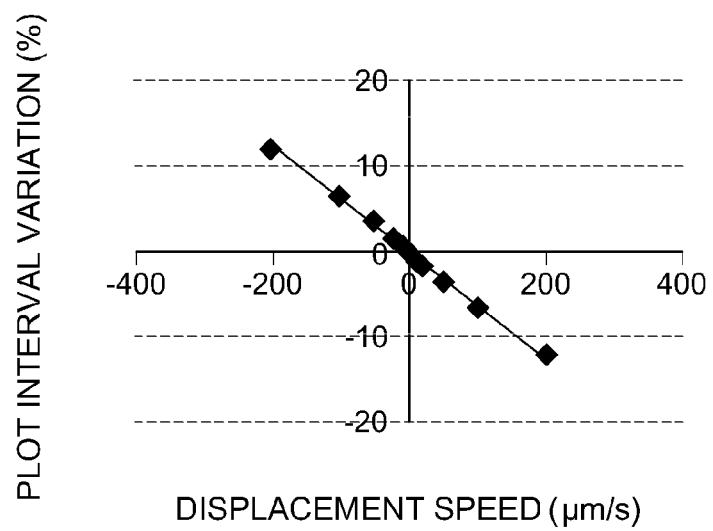
FIG. 5 is a graph illustrating an example of a correction map.

FIG. 5 is a graph illustrating an example of the correction map. The horizontal axis in FIG. 5 represents a displacement speed ($\mu$m/s). The vertical axis in FIG. 5 represents a variation (%) in the time axis of the scan waveform.

When the displacement speed is negative in FIG. 5, the sheet is displaced away from the terahertz wave detector 12b1 (i.e., downward in FIG. 2). In this case, the larger the absolute value of the displacement speed, the higher the displacement speed. When the displacement speed is positive in FIG. 5, the sheet is displaced toward the terahertz wave detector 12b1 (i.e., upward in FIG. 2).

When the displacement speed is negative, a variation in the time axis of the scan waveform is positive. This means that the time axis of the scan waveform varies such that the time axis of the scan waveform is extended. In other words, the scan waveform varies such that the time $\Delta t$ between detection of the peak P1 and detection of the peak P2 is increased. When the displacement speed is positive, a variation in the time axis of the scan waveform is negative. This means that the time axis of the scan waveform varies such that the time axis of the scan waveform is reduced. In other words, the scan waveform varies such that the time $\Delta t$ between detection of the peak P1 and detection of the peak P2 is reduced. The larger the absolute value of the variation in the time axis of the scan waveform, the greater the variation in the time axis of the scan waveform.

In one example, a process for correcting a scan waveform in accordance with the correction map preferably involves: determining a variation in the time axis of the scan waveform by making reference to the correction map in accordance with the displacement speed detected by the displacement sensor 13; and correcting the scan waveform such that the variation in the time axis is corrected. When the displacement speed is negative in the above-described example, the scan waveform correcting process preferably involves determining the magnitude of the variation in the time axis in accordance with the correction map, and correcting the scan waveform such that the time Δt is reduced in accordance with the magnitude of the variation determined. When the displacement speed is positive in the above-described example, the scan waveform correcting process preferably involves determining the magnitude of the variation in the time axis in accordance with the correction map, and correcting the scan waveform such that the time Δt is increased in accordance with the magnitude of the variation determined. When the displacement speed is constant during a time period in which the scan waveform is acquired, the scan waveform correcting process may be performed on the assumption that a variation in the time axis of the scan waveform is constant. When the displacement speed changes during a time period in which the scan waveform is acquired, the scan waveform correcting process may involve correcting the time axis of the scan waveform for each interval between plots, for example.

The third processor 14c is configured to calculate the thickness of the film of the sheet in accordance with the peaks of terahertz wave intensity that appear in the scan waveform corrected by the second processor 14b. In one example, the calculation performed by the third processor 14c preferably involves determining the time Δt between detection of the peak P1 and detection of the peak P2 in accordance with the scan waveform corrected as mentioned above, and calculating the film thickness in accordance with the time Δt by a predetermined computational expression.

Figure 6:
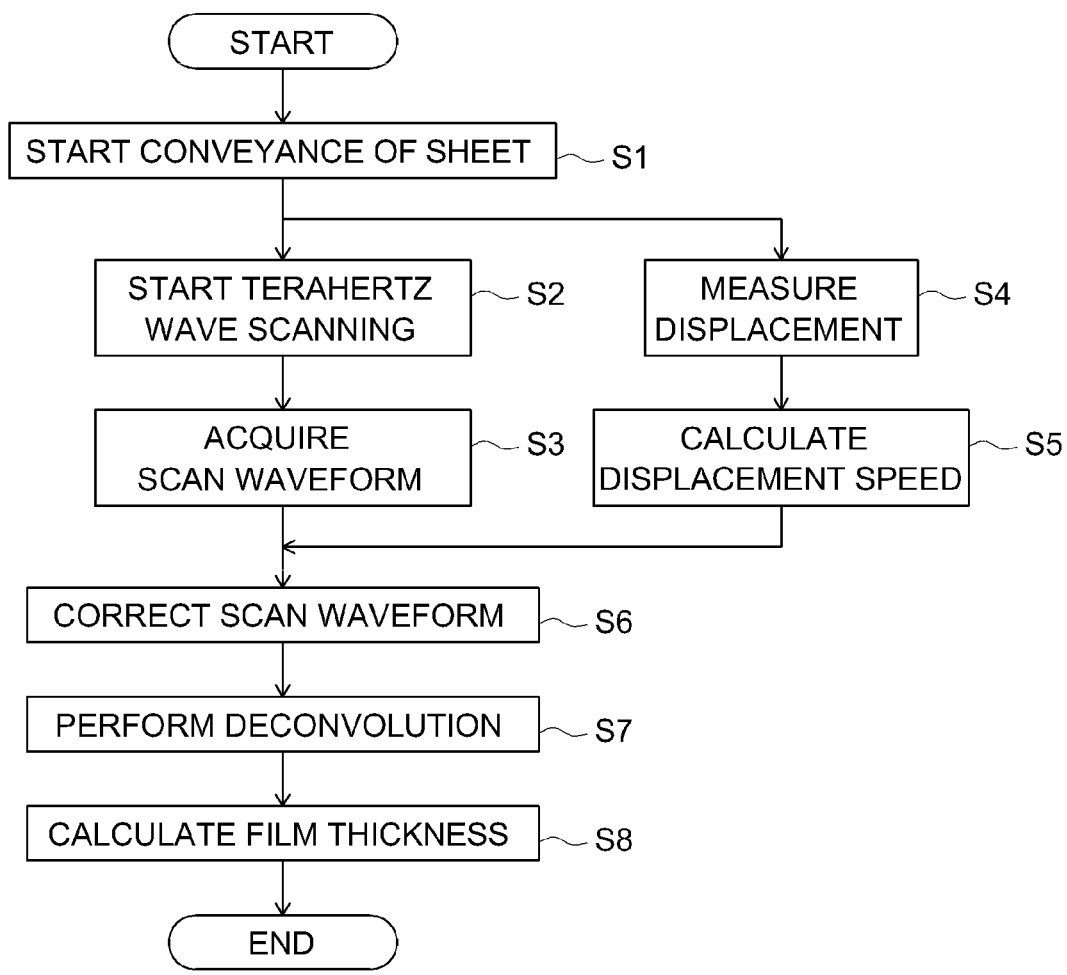
FIG. 6 is a flow chart illustrating process steps to be performed by the film thickness measuring apparatus 10.

FIG. 6 is a flow chart illustrating process steps to be performed by the film thickness measuring apparatus 10.

As illustrated in FIG. 6, the film thickness measuring apparatus 10 starts a process for conveying the sheet 2 (S1). Concurrently with this, the terahertz scanner 12 applies a terahertz wave to the sheet 2 (S2) so as to acquire a scan waveform in accordance with a reflected wave of the terahertz wave (S3). Concurrently with the application of the terahertz wave to the sheet 2, the displacement sensor 13 detects displacement of the sheet 2 in its thickness direction while the sheet 2 is conveyed along the conveyance path (S4). Subsequently, the film thickness calculator 14 calculates the speed of displacement of the sheet 2 in its thickness direction (S5). The film thickness calculator 14 then corrects the scan waveform in accordance with the scan waveform acquired and the speed of displacement of the sheet 2 in its thickness direction (S6). As illustrated in FIG. 6, the present embodiment subsequently involves performing a deconvolution process (S7) and calculating the thickness of the film 2b of the sheet 2 (S8).

In one example, the deconvolution process (S7) involves using the second pulsed light pa2, serving as probe light, so as to process a detection signal indicative of the terahertz wave t2 reflected off the sheet 2 (see FIG. 2). This reduces or prevents degradation in a signal indicative of the reflected wave of the terahertz wave that occurs between output of the terahertz wave from the terahertz wave generator 12a3 and incidence of the terahertz wave on the terahertz wave detector 12b1. Performing the deconvolution process makes it possible to more accurately detect the peaks P1 and P2 of the scan waveform that are caused by the film 2b (see FIGS. 3 and 4). Thus, performing the deconvolution process more accurately determines the time Δt between detection of the peak P1 and detection of the peak P2.

The process for calculating the thickness of the film 2b (S8) involves calculating the thickness of the film 2b of the sheet 2 in accordance with the peaks of terahertz wave intensity that appear in the scan waveform corrected. The film thickness calculating process in the present embodiment involves calculating a film thickness d in accordance with the time Δt between detection of the peak P1 and detection of the peak P2. The film thickness d is calculated by, for example, the following equation:

$$d = \Delta t \cdot c \cdot \cos\theta / 2n$$

where Δt denotes a time difference between the peaks mentioned above, c denotes the velocity of light, θ denotes the angle of incidence of a terahertz wave upon the sheet 2, and n denotes the refractive index of the terahertz wave refracted by the film 2b.

A preliminarily measured value is used as the refractive index. As indicated by the above equation, the terahertz wave may be applied to the sheet in an oblique direction with respect to the normal direction of the sheet. In other words, application of the terahertz wave to the sheet in its thickness direction does not necessarily mean that the terahertz wave is applied to the sheet in its normal direction.

As previously mentioned, the film thickness measuring apparatus 10 includes the conveyor 11, the terahertz scanner 12, the displacement sensor 13, and the film thickness calculator 14 (see FIGS. 1 and 2).

The conveyor 11 conveys the sheet 2 along the predetermined conveyance path.

The terahertz scanner 12 includes the applicator 12a, the receiver 12b, and the scan waveform acquirer 12c. The applicator 12a is configured to apply a terahertz wave to the sheet 2 in its thickness direction while the sheet 2 is conveyed along the conveyance path. The receiver 12b is configured to receive the terahertz wave reflected from the conveyance path. The scan waveform acquirer 12c is configured to perform a process for acquiring a scan waveform by recording the intensity of the terahertz wave over time in accordance with a detection signal indicative of the terahertz wave received by the receiver 12b.

The displacement sensor 13 is configured to detect displacement of the sheet 2 in its thickness direction at a location opposite to a portion of the terahertz scanner 12 from which the terahertz wave is applied to the conveyance path.

The film thickness calculator 14 includes the first processor 14a, the second processor 14b, and the third processor 14c.

The first processor 14a is configured to perform a process for determining, in accordance with the detection signal provided by the displacement sensor 13, the speed of displacement of the sheet 2 in its thickness direction while the sheet 2 is conveyed along the conveyance path.

The second processor 14b is configured to perform a process for correcting, in accordance with the displacement speed, the scan waveform acquired by the terahertz scanner 12.

The third processor 14c is configured to perform a process for calculating the thickness of the film 2b of the sheet 2 in accordance with the peaks P1 and P2 of the intensity of the terahertz wave that appear in the scan waveform corrected by the second processor 14b.

As previously mentioned, the film thickness measuring apparatus 10 includes the displacement sensor 13 to detect displacement of the sheet 2 in its thickness direction. In accordance with a detection signal provided by the displacement sensor 13, the film thickness measuring apparatus 10 determines the speed of displacement of the sheet 2 in its thickness direction. In accordance with the speed of displacement determined, the film thickness measuring apparatus 10 corrects the scan waveform acquired by the terahertz scanner 12. In accordance with the scan waveform corrected, the film thickness measuring apparatus 10 calculates the film thickness (i.e., the thickness of the film 2b formed on the sheet 2). Thus, the film thickness measuring apparatus 10 calculates the thickness of the film 2b of the sheet 2 while conveying the sheet 2.

In one example, the film thickness calculator 14 may include a recorder 14d recording a correction map that includes the relationship between the speed of displacement of the sheet 2 in its thickness direction and a variation in the time axis of the scan waveform. In this example, the second processor 14b preferably corrects the scan waveform in accordance with the correction map (see FIG. 5) recorded in the recorder 14d.

In one example, the film thickness measuring method disclosed herein preferably includes:

a) conveying, along a predetermined conveyance path, the sheet 2 on which a film 2b serving as a target for measurement is formed;

b) applying a terahertz wave to the sheet 2 in its thickness direction while the sheet 2 is conveyed along the conveyance path;

c) receiving the terahertz wave reflected off the sheet 2, and recording the intensity of the received terahertz wave over time so as to acquire a scan waveform;

d) measuring, concurrently with step b), the speed of displacement of the sheet 2 in its thickness direction while the sheet 2 is conveyed along the conveyance path;

e) correcting the scan waveform in accordance with the speed of displacement of the sheet 2 in its thickness direction; and f) calculating the thickness of the film 2b of the sheet 2 in accordance with the peaks of the intensity of the terahertz wave that appear in the scan waveform corrected.

Step e) may involve correcting the scan waveform in accordance with a correction map including the relationship between the speed of displacement of the sheet 2 in its thickness direction and a variation in the time axis of the scan waveform.

Although only one film 2b is formed on the sheet 2 in the foregoing embodiment, a plurality of films 2b may be stacked on the sheet 2 as long as the films 2b allow a portion of a terahertz wave to pass therethrough. In this case, the terahertz scanner 12 acquires a scan waveform by recording the intensity of the terahertz wave over time. Because a boundary or boundaries is/are present between the stacked films 2b, a plurality of peaks of terahertz wave intensity are observed. Thus, the thicknesses of the films 2b may be calculated in accordance with the peaks.

Various embodiments of the film thickness measuring method and the film thickness measuring apparatus disclosed herein have been described thus far. Unless otherwise specified, the embodiments of the film thickness measuring method and the film thickness measuring apparatus disclosed herein do not limit the present invention.

What is claimed is:

1. A film thickness measuring method comprising:
a) conveying, along a predetermined conveyance path, a sheet on which a film serving as a target for measurement is formed;
b) applying a terahertz wave to a single side of the sheet in its thickness direction while the sheet is conveyed along the conveyance path;
c) receiving the terahertz wave reflected off of the single side of the sheet, and recording an intensity of the received terahertz wave over time so as to acquire a scan waveform;
d) measuring, concurrently with step b), a speed of displacement of the sheet in its thickness direction while the sheet is conveyed along the conveyance path;
e) correcting the scan waveform in accordance with the speed of displacement of the sheet in its thickness direction; and
f) calculating a thickness of the film of the sheet in accordance with peaks of the intensity of the terahertz wave that appear in the scan waveform corrected.

2. The film thickness measuring method according to claim 1, wherein
step e) involves correcting the scan waveform in accordance with a correction map including a relationship between the speed of displacement of the sheet in its thickness direction and a variation in time axis of the scan waveform.

3. A film thickness measuring apparatus comprising:
a conveyor;
a terahertz scanner;
a displacement sensor; and
a film thickness calculator, wherein
the conveyor is configured to convey a sheet along a predetermined conveyance path,
the terahertz scanner includes
an applicator configured to apply a terahertz wave to a single side of the sheet in its thickness direction while the sheet is conveyed along the conveyance path,
a receiver configured to receive the terahertz wave reflected off of the single side of the sheet on the conveyance path, and
a scan waveform acquirer configured to record, over time, an intensity of the terahertz wave received by the receiver, so as to acquire a scan waveform,
the displacement sensor is configured to detect displacement of the sheet in its thickness direction at a location opposite to a portion of the terahertz scanner from which the terahertz wave is applied to the conveyance path, and
the film thickness calculator includes
a first processor configured to determine, in accordance with a detection signal provided by the displacement sensor, a speed of displacement of the sheet in its thickness direction while the sheet is conveyed along the conveyance path,
a second processor configured to correct, in accordance with the speed of displacement, the scan waveform acquired by the terahertz scanner, and
a third processor configured to calculate, in accordance with peaks of the intensity of the terahertz wave that appear in the scan waveform corrected by the second processor, a thickness of a film formed on the sheet.

4. The film thickness measuring apparatus according to claim 3, wherein
the film thickness calculator includes a recorder recording a correction map including a relationship between the speed of displacement of the sheet in its thickness direction and a variation in time axis of the scan waveform, and
the second processor is configured to correct the scan waveform in accordance with the correction map recorded in the recorder.

* * * * *